(12) United States Patent
Wang et al.

(10) Patent No.: US 7,122,747 B1
(45) Date of Patent: Oct. 17, 2006

(54) EXTENSION-TYPE ACCESS DEVICE

(75) Inventors: Beniz Wang, Taipei (TW); Tien-Ming Chan, Taipei (TW)

(73) Assignee: Inventec Corporation, Taipei (TW)

( * ) Notice: Subject to any disclaimer, the term of this patent is extended or adjusted under 35 U.S.C. 154(b) by 17 days.

(21) Appl. No.: 11/136,965

(22) Filed: May 25, 2005

(51) Int. Cl.
*H01R 13/46* (2006.01)
*H05K 5/00* (2006.01)

(52) U.S. Cl. .................. 174/520; 312/223.2; 361/683; 361/684; 361/686; 361/752; 361/756

(58) Field of Classification Search ................ 174/520; 361/683, 684, 686, 752, 756; 312/223.2
See application file for complete search history.

(56) References Cited

U.S. PATENT DOCUMENTS

| | | | |
|---|---|---|---|
| 6,449,142 B1* | 9/2002 | Wu | 361/680 |
| 6,525,932 B1* | 2/2003 | Ohnishi et al. | 361/686 |
| 6,654,841 B1* | 11/2003 | Lin | 710/301 |
| 6,728,108 B1* | 4/2004 | Chen | 361/736 |
| 2003/0016488 A1* | 1/2003 | Huang | 361/683 |
| 2003/0123220 A1* | 7/2003 | Huang | 361/685 |
| 2006/0023410 A1* | 2/2006 | Solomon et al. | 361/683 |

* cited by examiner

*Primary Examiner*—Hung V. Ngo
(74) *Attorney, Agent, or Firm*—Tim Tingkang Xia; Morris Manning Martin LLP

(57) ABSTRACT

An extension-type access device used in an information-and-electronic device includes a peripheral circuit board, an extension device set, a first connector, an isolating sheet, and an upper cover plate. An upper shell and a lower shell for clamping and securing the extension-type access device are further provided to make it become an access device module that can be inserted and taken out of a memory card. The extension device set consisting of a plurality of extension devices is secured on and electrically connected to the peripheral circuit board. The first connector is brazed to and electrically connected to the peripheral circuit board. The isolating sheet covers on top of the extension device set. The upper cover plate being a reverted-U shaped covering body has a plurality of cassette portions disposed on the top plate thereof. Through the execution, the invention has the efficacy of using a multiplication of memory cards at a time to make the usage of the memory cards more convenient.

19 Claims, 4 Drawing Sheets

EXTENSION-TYPE ACCESS DEVICE

BACKGROUND OF THE INVENTION

1. Field of the Invention

The invention relates to an extension-type access device, and more particularly, to an extension-type access device used in information-and-electronic device that can plug in a multiplication of memory cards at a time.

2. Description of the Prior Art

Following the progress of the science and technology and the computer's widespread application, there are numerous information such as files, drawings, pictures, etc. making use of digital electronic devices to perform such works as acquiring, editing, transferring, and backuping etc. The objective of this series of activities is to transform the very original data into useful information that often needs to perform dispersing and sharing further. Therefore, the dispersing and sharing of the digital information has become an important and indispensable part of the modern civilization society.

Since the distributing and sharing of the information are very frequent and important in use, our human beings are constantly performing research and development on the carrier for the relevant digital data storage, and are constantly targeting toward the research and development of light, thin, short, and small products. Memory card is one of the most widespread application and utilization of data storage carrier on the current market. As a result, under the economic scale of mass production, the price of the memory card is getting more and more economical and substantial for the users. Moreover, the card reader has become popular on the current market, and lots of digital cameras, mobile phones, and personal digital assistants (PDA) all have the set-up of extendable memory card. Consequently, the use of memory card has become an indispensable part of daily life such that almost everyone disregarding individuals, corporations, or institutional groups cannot break from it.

Following the progress of science and technology, these kinds of the individual portable digital commodities such as digital cameras, mobile phones, and personal digital assistants (PDA) are getting more and more diversified, accordingly, the demand to these portable-type electronic digital products is rising. However, as the storage medium is not unified yet, the memory card, besides a CF (Compact Flash Card) that is familiar to the public on the market, there are various kinds of memory card. Among them are SD card (Secure Digital Card), MMC card (Multi-Media Card), SM card (Smart Media Card), MS card (Memory Stick Card), CFV card (Compact Flash Value Card). Accordingly, a card reader that can read a multiplication of cards having various kinds of specification for the users emerges in response to the needs of the times. This kind card reader may claim to be "one device reads all".

The information-and-electronic device of the prior art generally has only a set-up of a card reader. Although each of this kind of card reader can read a multiplication of kinds of card, it has only a slot available to be plugged in and read by a card at a time. When it comes to the situation that relevant data store in different cards while in use it needs to load in the same information-and-electronic device to be edited or that there is a need to duplicate from one card to the other, a single card reader is obviously very inconvenient. Under the environment that the memory card is so frequently used, how to perform access action with respect to a multiplication of cards and to provide convenience at the same time has become a very important issue in reality.

SUMMARY OF THE INVENTION

In view of the above-mentioned problems of the prior art, the objective of the invention is to further improve the disadvantage of the single card reader of the prior art such that the users can conveniently make use of an information-and-electronic device to perform actions such as accessing and duplicating etc.

To achieve the above-mentioned objective, the invention provides an extension-type access device used in an information-and-electronic device that includes a peripheral circuit board, an extension device set, a first connector, an isolating sheet, and an upper cover plate. An upper shell and a lower shell for clamping and securing the extension-type access device are further provided to make it become an access device module that can be inserted and taken out. The extension device set consisting of a plurality of extension devices is secured on and electrically connected to the peripheral circuit board. The first connector is brazed to and electrically connected to the peripheral circuit board. The isolating sheet covers on top of the extension device set. The upper cover plate being a reverted-U shaped covering body has a plurality of cassette portions disposed on the top plate thereof. Through the execution, the invention has the efficacy of using a multiplication of memory cards at a time to make the usage of the memory cards more convenient.

The invention integrates a plurality of card readers that can read in a multiplication of memory cards and be able to assemble and dispose in an information-and-electronic device by the arrangement of a mechanism. Or, furthermore, by the use of a set of shell bodies to make it become a multi-unit of portable access device module.

Through the execution of the invention, one can at least achieve the following efficacies:

Through the execution of the invention, one can use a multiplication of memory cards at a time to make the usage of the memory cards even more convenient.

Through the execution of the invention, one can make the duplication between the multiplication of memory cards more convenient.

Through the execution of the invention, one can avoid the frequent insertion and taking out of the multiplication of memory cards to make the operation more efficient.

The accomplishment of this and other objectives of the invention will become apparent from the following description and its accompanying drawings of which

DETAILED DESCRIPTION OF THE PREFERRED EMBODIMENT

First Embodiment

Figure 1:
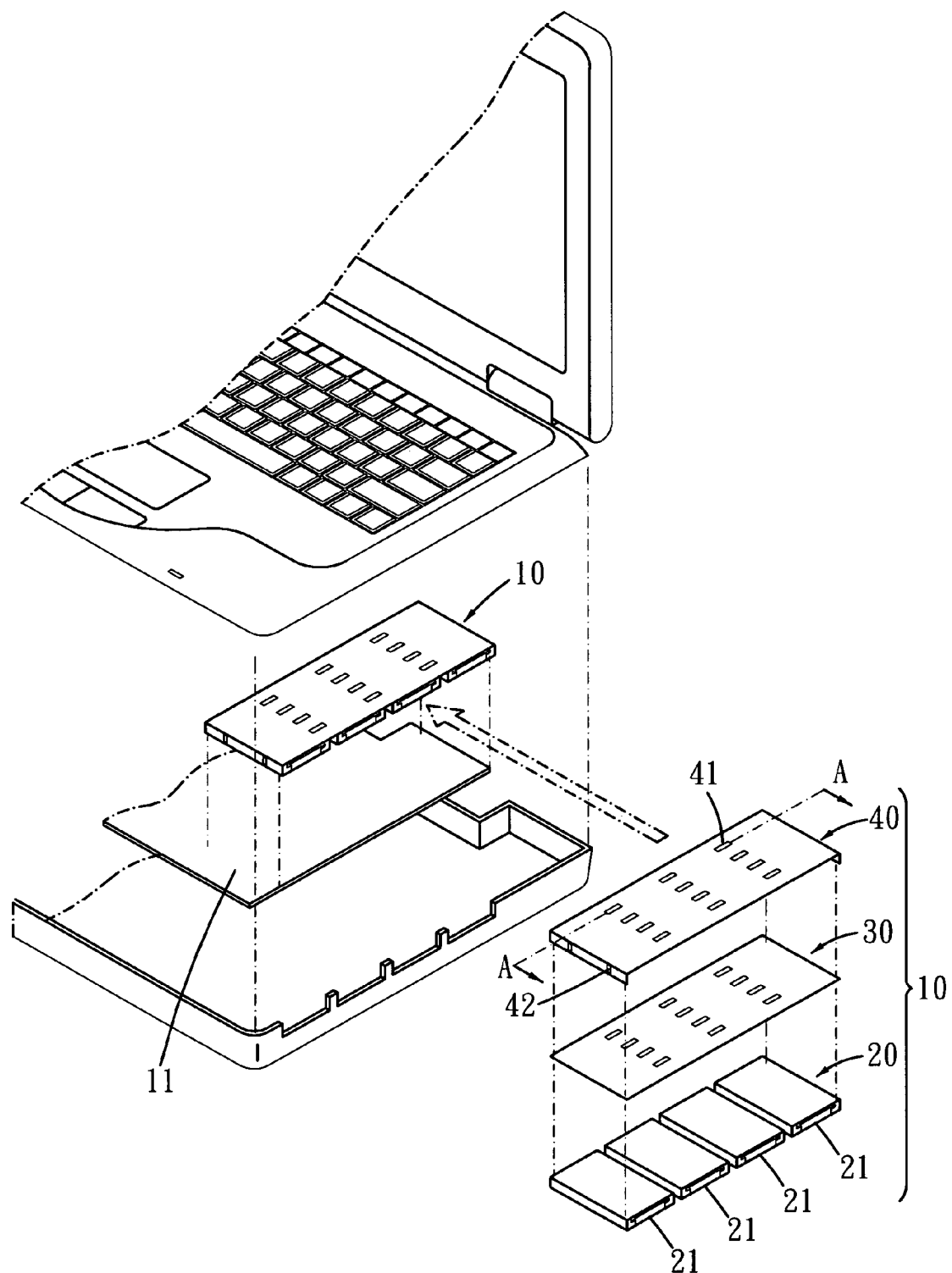
FIG. 1 is an isometric exploded view showing the application status of the first embodiment of the invention.

FIG. 1 is an isometric exploded view showing the application status of the first embodiment of the invention. As shown in FIG. 1, an extension-type access device (10)

applied in a main circuit board (11) of an information-and-electronic device includes an extension device set (20) having a plurality of extension devices (21), an isolating sheet (30), and an upper cover plate (40).

The main circuit board (11) is a print circuit board (PCB) structure of the prior art. The main circuit of the information-and-electronic device is disposed on the main circuit board (11) that can have each of the extension devices (21) directly braze and secure thereon as well as can provide each of the extension devices (21) electrical connection to the main circuit.

The extension device (21) is a card reader that can read in a multiplication of cards, for example, five-in-one card reader, six-in-one card reader, or seven-in-one card reader etc. The connecting pins of the extension device (21) are brazed directly to the main circuit board (11) of an information-and-electronic device which makes the extension device (21) secure to and electrically connect to the circuit of the main circuit board (11).

The isolating sheet (30), being a thin sheet made of insulated material, covers on the top of the extension device set (20) for making each of the extension devices (21) insulate one another and without interfering one another. All of these extension devices (21) have provided metal connecting points that are good conductors, and these metal connecting points for the current model expose on the exterior of the machine. Therefore, the isolating sheet (30) can function as mutual isolation among the extension devices (21) if these extension devices (21) combine with a metal upper cover plate (40). Although these isolating sheets (30) have the function of making the extension devices (21) isolate from one another, one can omit them if the upper cover plate (40) is made of nonconductive material. Other situation that one can omit the isolating sheet (30) is that the extension devices (21) selected has their metal connecting points not expose to the exterior of the machine, or there is no concern of conducting among the extension devices (21).

The upper cover plate (40) being a reverted-U shaped structure made of metal plate or hard plastics has a set-up of a plurality of rows of cassette portions (41) disposed on the top plate of the upper cover plate (40). The cassette portions (41) are integrally formed together with the top plate and becoming recesses indenting into the top plate. Moreover, there are wing plates extending from the top plate on the left and right sides, and a plurality of side cassette portions (42) having the same type and same function as cassette portions (41) are disposed on the wing plates. Between each of the cassette portion (41) and side cassette portion (42) or between two adjacent cassette portions (41) can exactly pop in to insert an extension device (21) and further secure them together with the upper cover plate (40) and the extension devices (21) by the use of screws. Consequently, the upper cover plate (40) can completely protect the extension devices (21).

Second Embodiment

Figure 2:
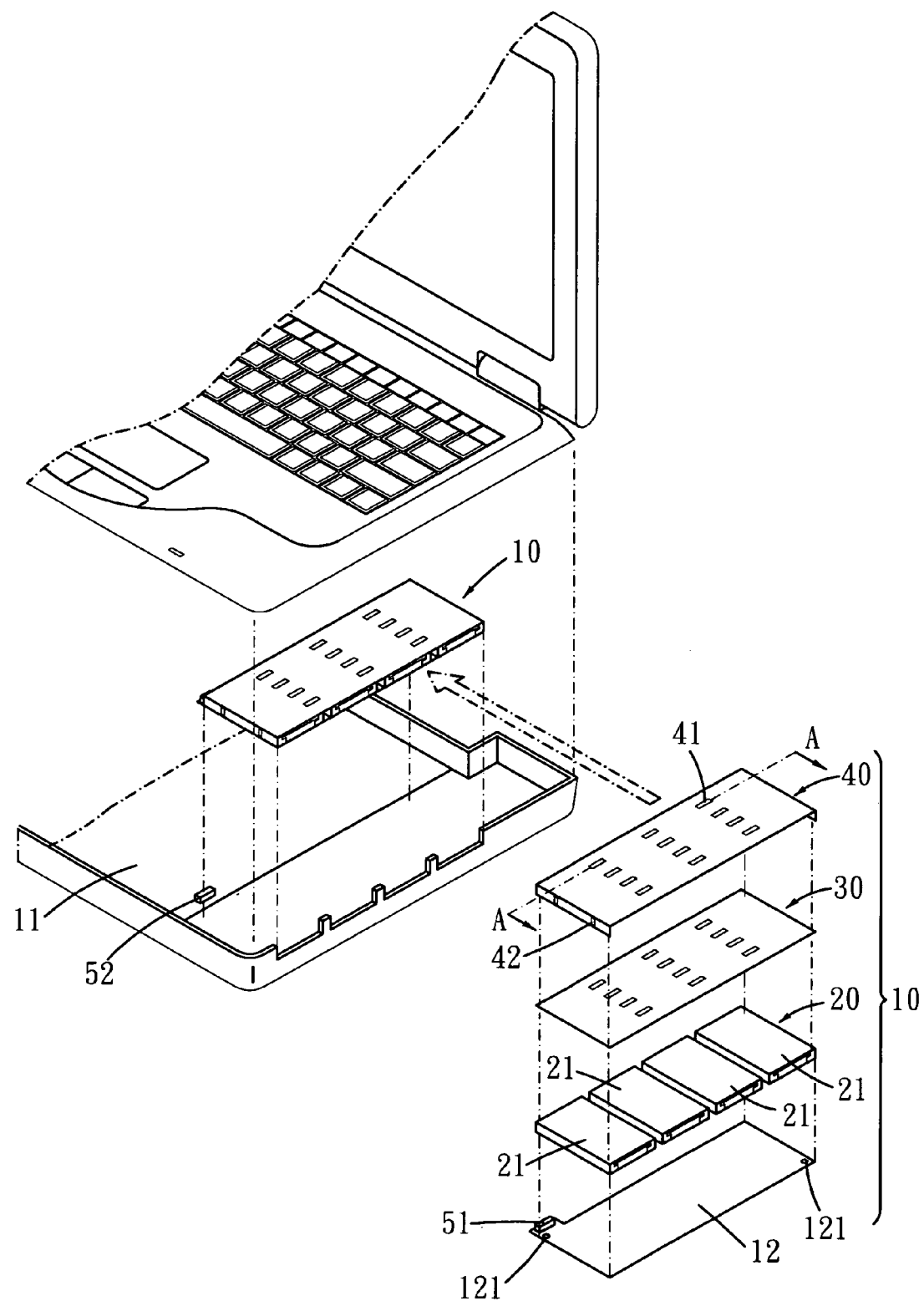
FIG. 2 is an isometric exploded view showing the application status of the second embodiment of the invention.

FIG. 2 is an isometric exploded view showing the application status of the second embodiment of the invention. As shown in FIG. 2, an extension-type access device (10) applied in an information-and-electronic device includes a peripheral circuit board (12), an extension device set (20) having a plurality of extension devices (21), a first connector (51), an isolating sheet (30), and an upper cover plate (40).

The peripheral circuit board (12) being a PCB structure of the prior art can have each of the extension devices (21) directly braze and secure thereon as well as can provide each of the extension devices (21) electrical connection to the first connector (51). Moreover, the peripheral circuit board (12) provides a plurality of securing holes (121) for facilitating the securing of the extension-type access device (10).

The extension device (21) is a card reader that can read in a multiplication of cards, for example, five-in-one card reader, six-in-one card reader, or seven-in-one card reader etc. The connecting pins of the extension device (21) are brazed directly to the peripheral circuit board (12) which makes the extension device (21) secure to and electrically connect to the circuit of peripheral circuit board (12).

The first connector (51) directly brazes to the peripheral circuit board (12) and electrically connects to the circuit of the peripheral circuit board (12). Moreover, the first connector (51) being a row-type connector or a plug-in type connector makes use of its connecting end to electrically connect to a second connector (52) disposed on the main circuit board (11). Furthermore, by the use of the connection between the first connector (51) and the second connector (52), the extension-type access device (10) of the embodiment of the invention can electrically connect to the main circuit board (11).

The isolating sheet (30), being a thin sheet made of insulated material, covers on the top of the extension device set (20) for making each of the extension devices (21) insulate one another without interfering one another. All of these extension devices (21) have provided metal connecting points that are good conductors, and these metal connecting points for the current model expose on the exterior of the machine. Therefore, the isolating sheet (30) can function as mutual isolation among the extension devices (21) if these extension devices (21) combine with a metal upper cover plate (40). Although these isolating sheets (30) have the function of making the extension devices (21) isolate from one another, one can omit them if the upper cover plate (40) is made of nonconductive material. Other situation that one can omit the isolating sheet (30) is that the extension devices (21) selected has their metal connecting points not expose to the exterior of the machine, or there is no concern of conducting among the extension devices (21).

The upper cover plate (40) being a reverted-U shaped structure made of metal plate or hard plastics has a set-up of a plurality of rows of cassette portions (41) disposed on the top plate of the upper cover plate (40). The cassette portions (41) are integrally formed together with the top plate and becoming recesses indenting into the top plate. Moreover, there are wing plates extending from the top plate on the left and right sides, and a plurality of side cassette portions (42) having the same type and same function as cassette portions (41) are disposed on the wing plates. Between each of the cassette portion (41) and side cassette portion (42) or between two adjacent cassette portions (41) can exactly pop in to insert an extension device (21) and further secure them together with the upper cover plate (40) and the extension devices (21) by the use of screws. Consequently, the upper cover plate (40) can completely protect the extension devices (21).

Third Embodiment

Figure 3:
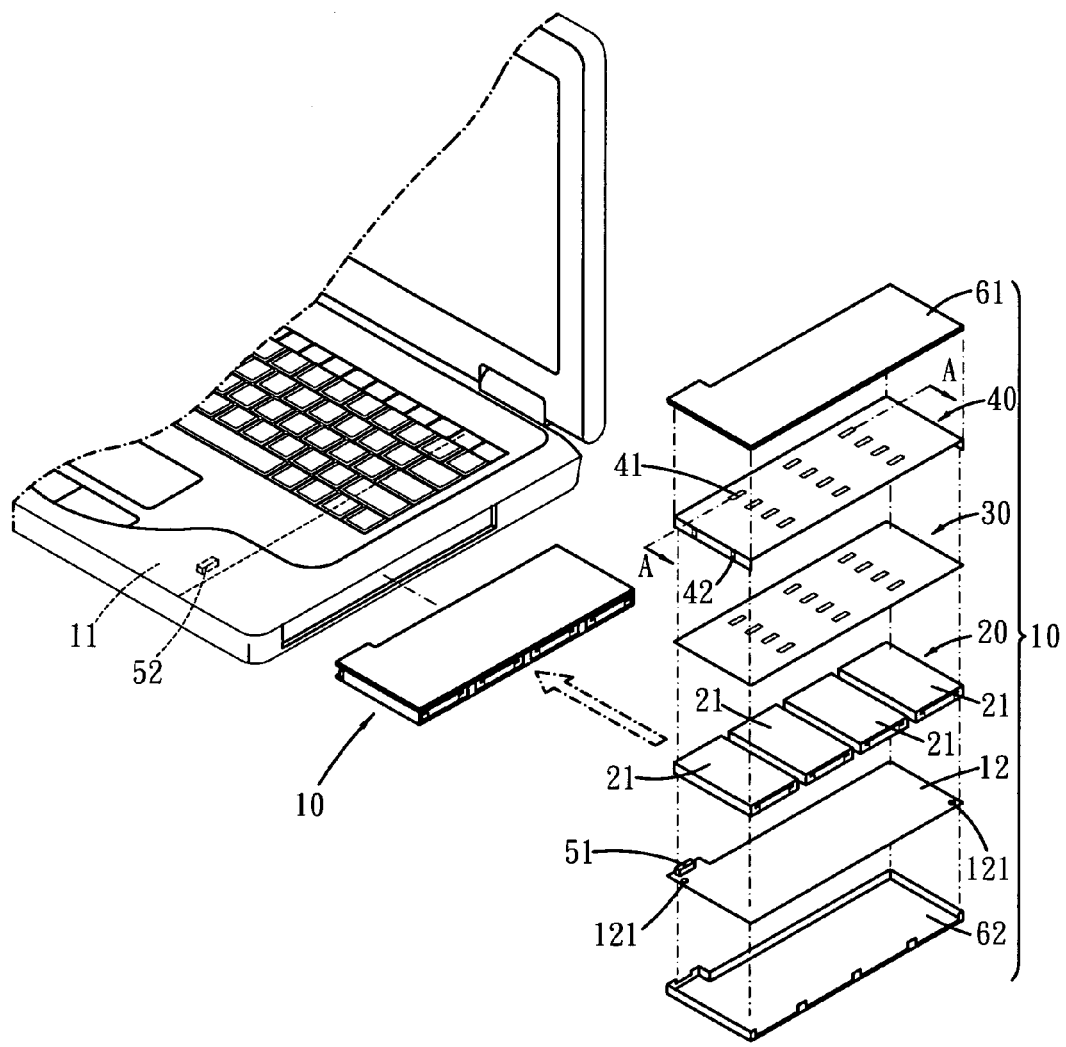
FIG. 3 is an isometric exploded view showing the application status of the first embodiment of the invention.

FIG. 3 is an isometric exploded view showing the application status of the third embodiment of the invention. As shown in FIG. 3, an extension-type access device (10) applied in an information-and-electronic device includes a peripheral circuit board (12), an extension device set (20) having a plurality of extension devices (21), a first connector (51), an isolating sheet (30), and an upper cover plate (40), an upper shell (61), and a lower shell (62).

The peripheral circuit board (12) being a PCB structure of the prior art can have each of the extension devices (21) directly braze and secure thereon as well as can provide each of the extension devices (21) electrical connection to the first connector (51). Moreover, the peripheral circuit board (12) provides a plurality of securing holes (121) for facilitating the securing of the extension-type access device (10).

The extension device (21) is a card reader that can read in a multiplication of cards, for example, five-in-one card reader, six-in-one card reader, or seven-in-one card reader etc. The connecting pins of the extension device (21) are brazed directly to the peripheral circuit board (12) which makes the extension device (21) secure to and electrically connect to the circuit of peripheral circuit board (12).

The first connector (51) directly brazes to the peripheral circuit board (12) and electrically connects to the circuit of the peripheral circuit board (12). Moreover, the first connector (51) being a plug-in type connector makes use of its connecting end to electrically connect to a second connector (52) disposed on the main circuit board (11). Furthermore, by the use of the connection between the first connector (51) and the second connector (52), the extension-type access device (10) of the embodiment of the invention can electrically connect to the main circuit board (11).

The isolating sheet (30), being a thin sheet made of insulated material, covers on the top of the extension device set (20) for making each of the extension devices (21) insulate one another without interfering one another. All of these extension devices (21) have provided metal connecting points that are good conductors, and these metal connecting points for the current model expose on the exterior of the machine. Therefore, the isolating sheet (30) can function as mutual isolation among the extension devices (21) if these extension devices (21) combine with a metal upper cover plate (40). Although these isolating sheets (30) have the function of making the extension devices (21) isolate from one another, one can omit them if the upper cover plate (40) is made of nonconductive material. Other situation that one can omit the isolating sheet (30) is that the extension devices (21) selected has their metal connecting points not expose to the exterior of the machine, or there is no concern of conducting among the extension devices (21).

The upper cover plate (40) being a reverted-U shaped structure made of metal plate or hard plastics has a set-up of a plurality of rows of cassette portions (41) disposed on the top plate of the upper cover plate (40). The cassette portions (41) are integrally formed together with the top plate and becoming recesses indenting into the top plate. Moreover, there are wing plates extending from the top plate on the left and right sides, and a plurality of side cassette portions (42) having the same type and same function as cassette portions (41) are disposed on the wing plates. Between each of the cassette portion (41) and side cassette portion (42) or between two adjacent cassette portions (41) can exactly pop in to insert an extension device (21) and further secure them together with the upper cover plate (40) and the extension devices (21) by the use of screws. Consequently, the upper cover plate (40) can completely protect the extension devices (21).

The upper shell (61) is formed by a flat plate and the perpendicular walls downward extended from the edges of the flat plate to form a covering structure.

The lower shell (62) is formed by a flat plate and the perpendicular walls upward extended from the edges of the flat plate. The perpendicular walls provide openings at the card inserting sites of the first connector (51) and each of the extension devices (21). The assembling work first finishes combining the peripheral circuit board (12), the extension device set (20), the connector, the isolating sheet (30), and the upper cover plate (40). Then, by the use of the packaging and protecting of the upper shell (61) and the lower shell (62), a shell body of extension-type access device (10) is formed to become a portable module structure that can apply in an information-and-electronic device that is compatible thereto.

Figure 4:
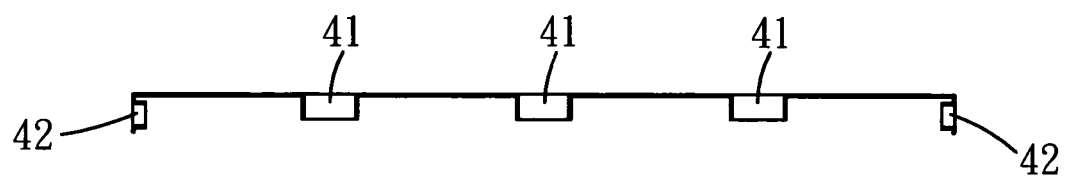
FIG. 4 is a cross-sectional view at section A—A of the upper cover plate of each of the above-mentioned embodiments.

FIG. 4 is a cross-sectional view at section A—A of the upper cover plate (40) of each of the above-mentioned embodiments. It further shows the concrete structures of those cassette portions (41) and side cassette portion (42) and their correlation with the upper cover plate (40).

The extension device (21) of the invention being disposed at a side of the shell body of an information-and-electronic device having corresponding openings of the cards disposed thereon can make the extension device (21) of the invention undertake the inserting-in and taking-out action of the cards. Or, the information-and-electronic device having a module opening can make the extension device (21) of the invention undertake combination and separation in way of modulation.

It will become apparent to those people skilled in the art that various modifications and variations can be made to the structure of the invention without departing from the scope or spirit of the invention. In view of the foregoing description, it is intended that all the modifications and variation fall within the scope of the following appended claims and their equivalents.

What Is claimed Is:

1. An extension-type access device used in a main circuit board of an information-and-electronic device, comprising:
    an extension device set, consisting of a plurality of extension devices having their connecting pins braze to the main circuit board such that the extension device is electrically connected to the circuit of the main circuit board; and
    an upper cover plate, having a plurality of cassette portions disposed on the top plate of the upper cover plate, and having a wing plate on both sides of the top plate extended downward therefrom, and having a plurality of side cassette portions disposed on the wing plates, and the extension devices are popped in to insert between each of the cassette portion and side cassette portion or between two adjacent cassette portions.

2. The extension-type access device used in a main circuit board of an information-and-electronic device as claimed in claim 1, wherein the extension device is a card reader.

3. The extension-type access device used in a main circuit board of an information-and-electronic device as claimed in claim 1, wherein the upper cover plate is a metal plate, and an isolating sheet being made of insulated material is further provided between the extension device set and the upper cover plate.

4. The extension-type access device used in a main circuit board of an information-and-electronic device as claimed in claim 1, wherein the upper cover plate is made of hard plastics.

5. The extension-type access device used in a main circuit board of an information-and-electronic device as claimed in claim 1, wherein those cassette portions are made by integrally forming with the top plate and become recesses indenting into the top plate.

6. The extension-type access device used in a main circuit board of an information-and-electronic device as claimed in claim 1, wherein those side cassette portions are made by integrally forming with the wing plates and becoming a recess indenting into the wing plates.

7. An extension-type access device used in an information-and-electronic device, comprising:
- a peripheral circuit board;
- an extension device set, consisting of a plurality of extension devices having their connecting pins braze to the peripheral circuit board such that the extension device is secured and electrically connected to the circuit of the peripheral circuit board;
- a first connector, brazing to the peripheral circuit board and electrically connecting to the circuit of the peripheral circuit board; and
- an upper cover plate, having a plurality of cassette portions disposed on the top plate thereof, and having a wing plate on both sides of the upper cover plate extended downward therefrom, and having a plurality of side cassette portions disposed on the wing plates, and the extension devices are popped in to insert between each of the cassette portion and side cassette portion or between two adjacent cassette portions.

8. The extension-type access device used in an information-and-electronic device as claimed in claim 7, wherein the peripheral circuit board is a printed circuit board.

9. The extension-type access device used in an information-and electronic device as claimed in claim 7, wherein the extension device is a card reader.

10. The extension-type access device used in an information-and-electronic device as claimed in claim 7, wherein the upper cover plate is a metal plate, and an isolating sheet being made of insulated material is further provided between the extension device set and the upper cover plate.

11. The extension-type access device used in an information-and-electronic device as claimed in claim 7, wherein the upper cover plate is made of hard plastics.

12. The extension-type access device used in an information-and-electronic device as claimed in claim 7, wherein those cassette portions are made by integrally forming with the top plate and become a recess indenting into the top plate.

13. The extension-type access device used in a main circuit board of an information-and-electronic device as claimed in claim 7, wherein those side cassette portions are made by integrally forming with the wing plates and becoming a recess indenting into the wing plates.

14. The extension-type access device used in a main circuit board of an information-and-electronic device as claimed in claim 7, wherein the peripheral circuit board has a plurality of securing holes.

15. The extension-type access device used in a main circuit board of an information-and-electronic device as claimed in claim 7, wherein the first connector is a row of connectors.

16. The extension-type access device used in a main circuit board of an information-and-electronic device as claimed in claim 7, wherein the first connector is a plug-in type connector.

17. The extension-type access device used in a main circuit board of an information-and-electronic device as claimed in claim 7 further comprising an upper shell and a lower shell.

18. The extension-type access device used in a main circuit board of an information-and-electronic device as claimed in claim 17, wherein the upper shell consists of a flat plate and perpendicular walls extending downward from the edges of the flat plate.

19. The extension-type access device used in a main circuit board of an information-and-electronic device as claimed in claim 17, wherein the lower shell consists of a flat plate and perpendicular walls upward extended from the edges of the flat plate, and the perpendicular walls provide openings at the card inserting sites of the first connector and each of the extension devices.

\* \* \* \* \*